March 21, 1944.  L. E. REEDER  2,344,638
MANUFACTURE OF INFLATABLE GAME BALLS
Original Filed May 13, 1941

INVENTOR.
Leo E. Reeder.
BY Allen & Allen
ATTORNEYS.

Patented Mar. 21, 1944

2,344,638

UNITED STATES PATENT OFFICE 2,344,638

MANUFACTURE OF INFLATABLE GAME BALLS

Leo E. Reeder, Cincinnati, Ohio, assignor to Sport Products Inc., Cincinnati, Ohio, a corporation of Ohio Original application May 13, 1941, Serial No. 393,228. Divided and this application September 26, 1941, Serial No. 412,482

2 Claims. (Cl. 154—16)

This invention relates to game ball manufacture and particularly to inflatable game balls such as are ordinarily called by the names of the games in which the balls are used, such as footballs, basketballs, volley balls, soccer balls, water polo balls, and many others.

The present application is a division of my application Serial No. 393,228, filed May 13, 1941, presenting the process aspects thereof.

In the art there has been considerable development in the manufacture of inflatable game balls wherein elongated cord windings or the applications of layers of fabric are employed to thicken the wall between the inner bladder and the outer cover.

Various arrangements have been attempted such as forming from flexible but non-resilient material semi-spherical core portions which are molded and fastened together along the peripheries of the semi-spheres, or sectional panels of materials are fastened together. The spheres are then placed in a winding machine and elongated cord windings are applied. Subsequently, however, it is necessary to cut a slit in the core and insert an inner bladder. While such a process of manufacture provides a satisfactory ball, a great many additional steps are required which, in accordance with my invention as herein disclosed, are unnecessary.

It has further been attempted to make playing balls by applying windings or cord or fabric to a wax mold, which wax mold has to be broken up and removed at a later period in the manufacture of the ball.

It is the object of my invention to start in the manufacture of each inflatable ball with the actual bladder which is to be used in that particular ball and to build up on this bladder in a manner which will provide a properly contoured inner carcass within which the bladder remains from the start of the operation until the ball is completed. The foregoing objects and other objects to which reference will be made in the ensuing disclosure I accomplish by proceding in accordance with the steps hereinafter outlined in which I have specifically disclosed one manner of utilizing my invention.

Referring to the drawing—

Figure 1:
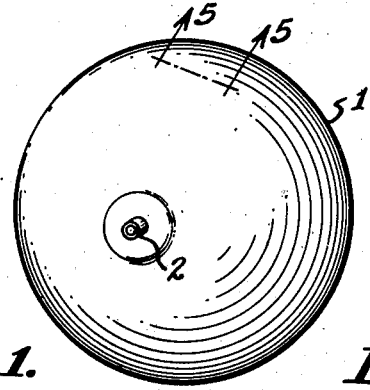
Figure 1 is a perspective view of an inflated bladder.
Figure 2:
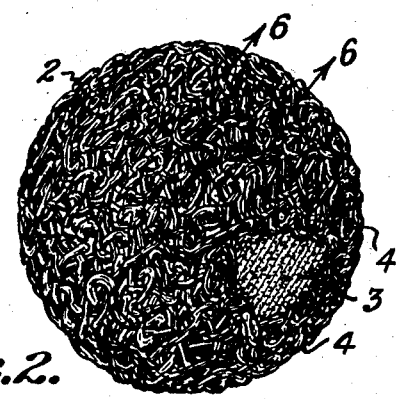
Figure 2 is a perspective view of the bladder after the application of a preferred type of flexible but non-resilient coating.
Figure 3:
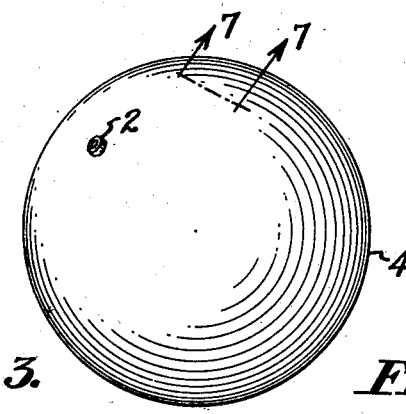
Figure 3 is a perspective view of the carcass of the ball after the first molding operation.
Figure 5:
Figure 6:
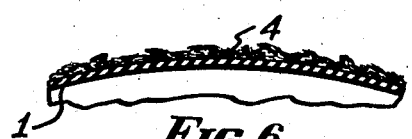
Figure 7:

Figures 5, 6 and 7 are enlarged fragmentary sectional views of the balls illustrated in Figures 1, 2 and 3, and taken on lines 5—5, 6—6 and 7—7 respectively.

Figure 4:
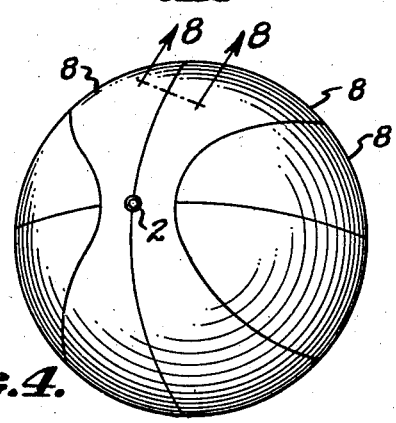
Figure 4 is a perspective view of the ball when completed after molding.
Figure 8:

Figure 8 is an enlarged section of the ball after it has passed through the various operations of inflating, winding, cementing, vulcanizing and attaching the outer cemented leather panels, the section being taken on line 8—8 of Fig. 4.

I will describe my process in connection with the manufacture of a basketball, it being understood that variations in pressure, shape of bladder and other conditions may be made in the manufacture of different kinds of playing balls.

The bladder 1 is inflated to a circumference of from 28 to 28½ inches. The weight of the bladder at this time is about 3½ ounces and the thickness of the wall about .028 inch. The bladder is provided with an inflating valve 2.

The next step is to coat the inflated bladder with an adhesive such as rubber cement 3. Coating material 4 such as cotton kapok, or other fibrous or mushy material is mixed in a batter of rubber cement to the consistency of pie dough. (Kapok is a mass of silky fibers investing the seeds of the silk cotton tree or kapok tree, and it is used commercially as a filling for mattresses. While I have described the use of a specific material kapok, it should be understood that my invention contemplates the use of other fibrous material.) This material is then applied as a coating 4 to the walls of the bladder covering the entire surface, the material being secured to the walls by means of the rubber cement 3. The thickness of the layer of the kapok batter is difficult to measure as its application will not be entirely even. I apply altogether about ¼ ounce of the kapok batter.

The inflated bladder with the coating layer applied is then set on a rack for about twelve hours to permit the kapok and the cement to dry.

After the inflated bladder has dried, the ball is placed in a vulcanizing mold of spherical inner conformation having a circumference of the spherical opening of about 29 inches. After the bladder is inserted in the mold the mold is then closed and the bladder inflated to about 5 pounds pressure. Heat is then applied to the mold and the ball carcass is vulcanized at a temperature of about 300° F. for three or four minutes.

Before opening the mold the bladder is deflated through the valve to remove some of the air pressure. The bladder when removed from the mold is now covered with a vulcanized coating of material, brought about by the vulcanizing process in the mold. The carcass or ball as it is now called consists of a bladder vulcanized and coated with a semi-firm, semi-flexible material which will permit the ball or carcass to be properly inflated and placed in a winding machine for further operations.

As has been set forth in the application of Hugo Goldsmith, Serial No. 259,227, filed March 1, 1939, the carcass is then placed in a winding machine in which the carcass is rotated between moving rollers and in which cord 5 which passes through a supply of latex solution or rubber cement is wound around and around the carcass in elongated windings. After an adequate number of windings 5 have been made on the ball the circumference of the ball will be 29 inches.

Layers of cloth are then applied and the seams of the cloth are lapped. The top layer of cloth 6 is preferably thin canvas or airplane cloth treated with uncured rubber. I have found that the treatment of the cloth with uncured rubber provides a surface which facilitates its application. The outer layer of cloth has the seams butted and a skin coat of red rubber 7 is applied which exudes into the seams.

The carcass thus built up is again inserted into the mold and inflated and the ball is vulcanized for a period of a few minutes. After removal from the vulcanizing mold, the exterior surface of the ball is cemented and leather segments 8 are applied in the well known manner.

It should be distinctly understood that while I have described in detail a specific method of manufacturing a game ball, that the gist of my invention resides in the application to an inflatable bladder of a coating of material which after vulcanization provides a flexible but substantially non-elastic thin wall which may be readily processed without likelihood of deformation during the processing so that the bouncing of the ball will always be accurate and so that there will be no flat spots or dead spaces to disadvantageously affect the physical properties of the ball during its use. Other well known steps of building up the carcass after this first vulcanization may be employed without departing from the principle of my invention.

Having thus described my invention, what I claim as new and desire to secure by Letters Patent is:

1. In the manufacture of an inflatable game ball the steps of preparing an inflatable bladder with a wall sufficiently semi-firm and semi-flexible as to permit the application of windings thereto without deformation which consists in inflating an inflatable bladder through the valve therein, then applying a thin coating of an adhesive, then applying a thin coating of a batter composed of an adhesive within which fibrous material is thoroughly mixed, permitting the bladder with its thin coating to dry, then inserting the inflated bladder with its dried coating into a vulcanizing mold and inflating the bladder through the valve to about five pounds pressure, then vulcanizing the inflated bladder for several minutes, then deflating the bladder to prevent its bursting when removed from the mold, and after removal regulating the pressure within the bladder whereby windings may be applied thereto without deformation of the inflated bladder.

2. In the manufacture of an inflatable game ball the steps of preparing an inflatable bladder with a wall sufficiently semi-firm and semi-flexible as to permit the application of windings thereto without deformation which consists in inflating an inflatable bladder through the valve therein, then applying a thin coating of an adhesive, then applying a thin coating of a batter composed of an adhesive within which kapok is thoroughly mixed, permitting the bladder with its thin coating to dry, then inserting the inflated bladder with its dried coating into a vulcanizing mold and inflating the bladder through the valve to about five pounds pressure, then vulcanizing the inflated bladder for several minutes, then deflating the bladder to prevent its bursting when removed from the mold, and after removal regulating the pressure within the bladder whereby windings may be applied thereto without deformation of the inflated bladder.

LEO E. REEDER.